United States Patent [19]

Boling et al.

[11] 4,282,967
[45] Aug. 11, 1981

[54] GRAIN ELEVATOR CONTROLS

[75] Inventors: Harry O. Boling, Garland; Larry R. Brzycki, Lewisville, both of Tex.

[73] Assignee: Maxi-Tronic, Inc., Dallas, Tex.

[21] Appl. No.: 113,138

[22] Filed: Jan. 17, 1980

[51] Int. Cl.³ .............................................. B65G 43/04
[52] U.S. Cl. .................................... 198/571; 198/573; 198/856
[58] Field of Search ............... 198/571, 573, 577, 703, 198/810, 856; 361/239, 240

[56] References Cited

U.S. PATENT DOCUMENTS

| 2,792,106 | 5/1957 | Fredh et al. | 198/856 |
|---|---|---|---|
| 2,853,181 | 9/1958 | Lillehaugen | 198/573 X |
| 3,017,145 | 1/1962 | Tarber | 303/105 X |
| 3,350,637 | 10/1967 | Pochtar | 303/95 X |
| 3,780,297 | 12/1973 | Geary | 198/856 X |
| 3,845,375 | 10/1974 | Stiebel | 198/856 X |
| 3,867,647 | 2/1975 | Callahan et al. | 303/91 X |
| 3,883,754 | 5/1975 | Fleischer et al. | 303/91 X |

FOREIGN PATENT DOCUMENTS 495248 3/1976 U.S.S.R. .................................. 198/856

Primary Examiner—Jeffrey V. Nase
Attorney, Agent, or Firm—Kenneth R. Glaser

[57] ABSTRACT

Disclosed is an electronic sensor and control for monitoring the rate of transport of grain elevator buckets, the electronic control including a metal detector probe for sensing the passage of the buckets past the head and a control module for processing the signals from the head to produce a D-C voltage proportional to the bucket transport rate. Trigger networks responsive to the D-C voltage activate appropriate alarms and shutdown of various phases of the grain elevator operations. An automatic calibration control enables calibration of the D-C voltage for different desired rated speeds of the bucket transport.

10 Claims, 4 Drawing Figures

GRAIN ELEVATOR CONTROLS

This invention relates to grain elevator equipment, more particularly to electronic control apparatus for grain elevator equipment, and even more particularly to motion detector apparatus for monitoring the rate of transport of the belt-supported grain buckets and effecting control over the operation of the grain elevator in response to undesirable slowdowns in the bucket transport rate.

The use of grain elevators is a well known expedient in the agricultural industry for the transport and dispensing of stored grain materials. Ordinarily, these grain elevators are located adjacent storage bins or silos and comprise extremely long continuous belts to which are attached a large number of substantially equally spaced grain containers or "buckets"; and, in accordance with typical operation, as the continuous belts are driven, the grain buckets are transported and effective to elevate the grain from ground level to the top of the silos where the granular material is then ejected into chutes emptying into the silos for storage therein.

The efficient and economic operation of these grain elevators desirably demand that the transport belt (and supported buckets) rapidly reach the normal desired operating speed and that this rated speed be maintained during its operation. Unfortunately, there are numerous conditions which will result in the stoppage or undesirable slowdown of the belt and bucket transport which, unless detected sufficiently early, will not only inhibit the efficient operation of the equipment, but could result in costly damage to the drive motors and related apparatus, losses associated with the resulting work stoppage, and dangerous operating conditions. For example, excessive belt slippage will produce increased friction and pose the danger of fires and explosion. As a consequence, the provision of control apparatus which would effectively monitor any unexpected slowdowns in the belt and bucket travel, alert the operator at a sufficiently early time, and effect shutdown of the various equipment upon detection of unacceptable slowdowns of the bucket transport rate, would enable suitable protection of the entire elevator equipment, as well as result in substantial reductions in down-time.

It is therefore a principal object of the present invention to provide new and improved apparatus for monitoring the belt and bucket speed of grain elevators for automatically activating warning devices and, if necessary, effecting shutdown of various phases of the elevator operation in response to unacceptable slowdowns thereof.

It is an additional object of the present invention to provide new and improved electronic control apparatus for monitoring the rate of transport of grain elevator buckets in order to assure that the buckets (and supporting transport belt) initially reaches the desired normal operating speed and does not thereafter drop substantially below this rated speed.

It is a still further object of the present invention to provide new and improved electronic motion detector apparatus for grain elevator equipment which is effective to sense and appropriately respond to the velocity of bucket travel by measuring and responding to the transport rate of the buckets passing through a magnetic field generated by the motion detector apparatus.

In accordance with these and other objects, the present invention is directed to motion detector apparatus having a probe assembly suitably mounted with grain elevator equipment to detect the passage, and rate of passage, of transported buckets past the probe assembly. The apparatus includes a remotely located control module electronically coupled to the probe assembly for generating a D-C voltage proportional to the bucket transport rate for actuating trigger control networks to activate alarms and shut-down operations when the bucket transport rate drops below certain predetermined rates.

In accordance with certain unique features of the invention, the probe assembly includes a metal detector for sensing metallic or metallic associated buckets; and a unique calibration control network enables the efficient and automatic calibration of the motion detector for different desired rated speeds of the bucket transport.

Specific features of the invention, as well as additional objects and advantages thereof, will become more readily understood from the following detailed description taken in conjunction with the accompanying drawings, in which.

Figure 1:
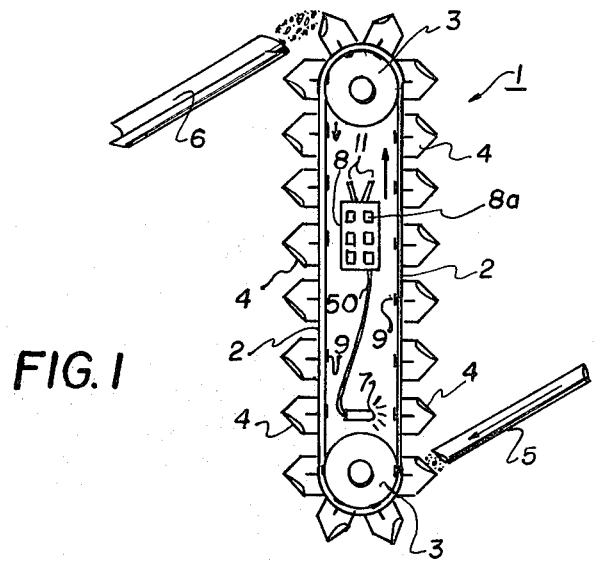
FIG. 1 is a diagrammatic representation of grain elevator equipment illustrating the association of the motion detector apparatus of the present invention therewith.

Referring initially to FIG. 1, a conventional type of grain elevator equipment 1 is depicted as including a vertically oriented continuous transport belt 2 passing around a pair of pulleys 3 driven by motive means (not shown), the belt consequently being continuously driven in the counterclockwise direction depicted by the arrows. Suitably attached to the belt, and preferably equally spaced along its length, are a large number of containers or buckets 4 adapted to receive and transport grain ejected from a conveyor 5 located at a "feed" station, the conveyor 5 being, for example, a conventional screw type conveyor driven by motive means (not shown).

The construction and operation of the grain elevator equipment 1 are conventional; and, as well known, the counterclockwise movement of the belt 2 transports the grain buckets 4 to the feed station where they respectively receive a supply of grain from the conveyor 5, the grain supply thereafter being transported to and around the apex of the equipment 1 where it is consequently thrown into chutes 6 communicating with, and for storage within, conventional grain silos. The empty buckets are thereafter transported from this dispensing station down the left leg of the grain elevator to repeat the just-described cycle of operation.

The specific design of the grain buckets 4 is not critical, it only being necessary that they be constructed of a material, or have a material affixed or associated with it, which is "detectable" by the probe assembly of the motion detector apparatus of the present invention. In accordance with a preferred embodiment of such motion detector, and as subsequently described in greater detail, the probe assembly is essentially a metal detector, the motion detector apparatus of the present invention therefore being particularly suited for grain elevator equipment which employs grain buckets of a metallic material or, as specifically depicted in FIGS. 1 and 2, grain buckets which are affixed to the transport belt 2 by metallic fasteners or bolts 9.

Figure 2:
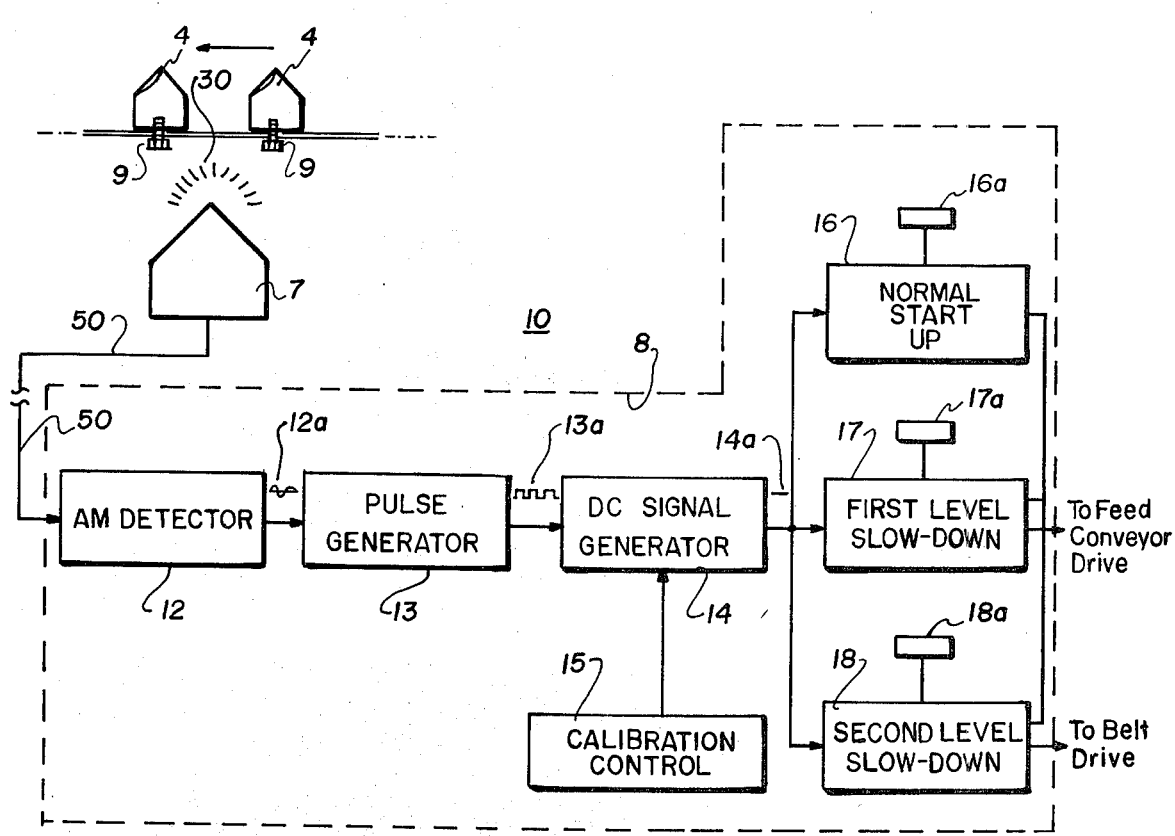
FIG. 2 is a block diagram of the electronic motion detector apparatus of the present invention illustrating its detection of grain elevator buckets.

As illustrated in FIGS. 1 and 2, the electronic motion detector apparatus 10 of the present invention includes a probe assembly 7 and a control module 8 remote from, but electrically interconnected by way of a cable 50 with, the probe assembly 7. The probe assembly 7 is preferably mounted with respect to the grain elevator equipment 1 at a situs sufficiently proximate to the belt 1 so as to detect the passage of each bucket 4 (in the manner subsequently described) past such situs. The control module 8 can be disposed at any convenient location, is preferably housed within a protective enclosure having a display panel with indicator lights 8a or the like for indicating the operational status of the motion detector. Output leads or cables 11 are electrically interconnected with means for interrupting the motive means driving the transport belt and the conveyor 5, all as subsequently described.

Referring now to FIG. 2, the overall design and operation of the electronic motion detector apparatus 10 of the present invention is now described. Accordingly, the probe assembly 7 is effective to generate a magnetic field 30 and detect the intrusion of metal into this field. Thus, as each grain bucket passes in proximity to the probe, the metallic bolts of each buckets are respectively sensed, thus generating an amplifier signal at the output of the probe assembly 7 which is thereafter inputted to an initial (detector and filter) stage 12 of the control module 8. The detector stage 12 is effective to produce a time varying analog signal 12a at its output in response to the amplified signal inputted thereto, the magnitude of which is proportional to the proximity of each bucket 4 to the head of probe 7. The output of stage 12 is coupled to the input of a pulse generator 13 which is effective to generate, in response to the receipt of the aforementioned analog signal 12a, a digital pulse signal train 13a, the pulse frequency of which is equal to the rate of metal detecting "events," i.e. the rate of transport of each bucket past the probe 7.

The output of the pulse generator 13 is coupled to the input of a DC signal generator 14 which is effective to generate at its output, in response to the receipt of pulse train 13a, a DC voltage 14a, the magnitude of which is proportional to the bucket transport rate. Also coupled to the signal generator 14 is a calibration control network 15 which is effective to assure that the DC voltage 14a is of a predetermined known magnitude when the bucket transport rate is at the desired normal operating speed or rated value. Thus, and as subsequently described in greater detail, any slowdown in the rate of bucket transport below this desired operating value will result in a corresponding decrease in the magnitude of the DC voltage 14a below this predetermined known magnitude. The calibration control network 15 can be any type of manually resettable adjustment; but, in accordance with a unique feature of the present invention, is an automatic calibrator capable of being automatically adjusted to accommodate a wide range of alternate desired operating speeds of the elevator, all as subsequently described.

The output of the DC signal generator 14 is respectively coupled to the inputs of three trigger control networks 16, 17, and 18, as depicted in FIG. 2, the respective purposes of which are now described. Specifically, trigger control network 17 is effective to monitor the output DC voltage 14a and generate a trigger signal at its output when a drop in magnitude of such voltage sufficiently below the calibrated value indicates a slow-down in the bucket transport speed below a first level (for example, below 90% of desired normal operating speed). This trigger signal could then, for example, be used to interrupt the motive drive for the feed conveyor 5, while still allowing the transport belt 2 (and buckets) to continue to be driven.

In similar manner, the trigger control network 18 monitors the output DC voltage 14a to generate a trigger signal at its output when the voltage drop indicates a second level, and greater, bucket rate slow-down (of say, 80% of desired normal operating speed). This trigger signal would then normally be employed to interrupt the motive drive for the transport belt, i.e to shut down the entire grain elevator.

The trigger control network 16 is effective to assure normal start-up conditions for the elevator by (1) maintaining the trigger networks 17 and 18 in an inoperative mode while the bucket transport increases to its normal operating speed (or at least above the 90% level represented by trigger network 17) and (2) generating a trigger signal at its output (to shut down the elevator) in the event of a transport belt stoppage or undesirable slow-down before the transport rate reaches the normal operating speed. Each of the control networks 16, 17 and 18 would desirably have indicator alarms (depicted as 16a, 17a, and 18a) to visually and/or audibly indicate the just described respective conditions.

It is thus believed readily apparent that the motion detector apparatus 10 of the present invention is effective (by way of the metal detector probe assembly 7) to monitor and electronically indicate the passage of each bucket in proximity thereto, with the electrically interconnected control module 8 effective to process the resulting signals at the output of the probe to generate signals representative of the speed or velocity of the bucket (and belt) transport for effectively establishing an early warning detection system for actuating appropriate alarms and shut-down operations of the elevator equipment whenever (1) the bucket velocity does not achieve the initial desired operating speed or (2) when such speed, once achieved, slows down to one or more level below such normal operating speed.

Figure 3:
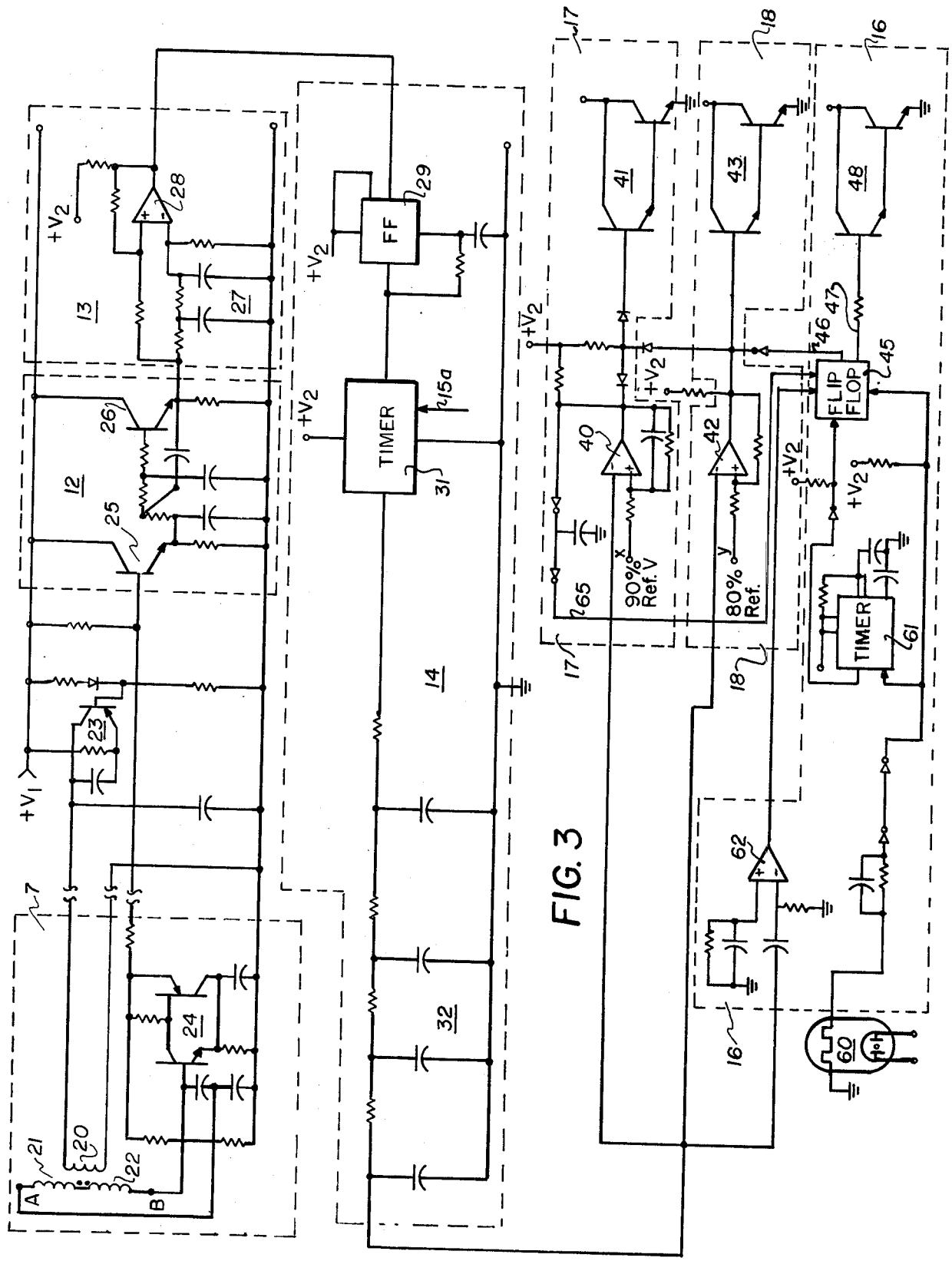
FIG. 3 is a detailed schematic of a preferred embodiment of the motion detector apparatus depicted in FIG. 2.

Referring to FIG. 3, there is now described a preferred embodiment of the motion detector apparatus 10. Accordingly, located within the probe assembly 7 are an exciter coil 20 and a pair of coaxially disposed and mutually coupled sense coils 21 and 22, the sense coils being electrically connected in series-opposing relationship. Power to the exciter coil 20 is derived from the output of a conventional oscillator 23 (located in the control module 8) with a voltage consequently being induced across each of the coils 21 and 22.

The interrelationship between the exciter (transmit) coil 20 and sense (receiver) coils 21 and 22 is such that, in the absence of a detectable metal within the magnetic field generated by the coil 20, the voltages across coils 21 and 22 will substantially cancel one another, thus creating a "null" signal condition at the output terminals AB. This interrelationship can be maintained, for example, by having the coils 21 and 22 of equal winding and/or adjusting their respective position with respect to the primary coil 20.

As each grain bucket 4 passes into proximity with the probe 7, the resulting intrusion of the detectable metal bolts 9 into the magnetic field generated by the coil 20 results in an increase of voltage across terminals AB. This voltage is appropriately boosted by an amplifier 24 located in the probe assembly 7, the amplified voltage thereafter being coupled to the input of transistor 25 of the detector and filter stage 12.

The detector and filter stage 12 includes the input and output transistors 25 and 26 and associated filter components (as depicted in FIG. 3) and is effective to detect and filter the voltage at the output of the amplifier 24 to produce a time varying analog (AM) signal (depicted in FIG. 2 as 12a) at the output of transistor 26, the magnitude of which is proportional to the proximity of the grain buckets to the head of the probe assembly 7. This signal is then coupled to the input of the pulse generator stage 13.

The pulse generator 13 comprises a conventional integrator network 27 and a comparator 28, the output of the integrator 27 being coupled to the inverting (or reference) terminal of the comparator 28 with the signal from the output of network 12 being coupled to the non-inverting input terminal of the comparator 28. As a consequence, a train of digital pulses is generated at the output of the comparator 28, the width of each pulse determined by the "zero crossing" points of the analog signal from stage 12. Thus, the pulse frequency of the digital signal at the output of comparator 13 (signal 13a) corresponds to the rate of transport of the grain buckets past the probe 7. This signal is then inputted to the DC signal generator stage 14.

The DC signal generator 14 (FIG. 2) comprises an initial pulse-forming circuit (conventional flip-flop 29) effective to produce pulse "spikes" corresponding to, and at the rate of, each of the pulses from the output of comparator 28. The output of flip-flop 29 is coupled to the input of a conventional timer 31, the frequency of the timer output pulses therefore being determined by the then-existing transport rate of the buckets. The output from timer 31 is coupled to the input of a multistage integrator network 32, thus providing at the output of such integrator network (and consequently as the output of the signal generator 14) an essentially ripple-free DC voltage (depicted in FIG. 2 as 14a), the magnitude of which is proportional to the rate of bucket travel.

The timer 31 is initially calibrated by setting the calibration control signal 15a (from the output of the calibration control network 15) at a value which establishes the pulse width duty cycle of the timer (preferably at 50%) so as to fix the magnitude of the DC voltage at a set reference magnitude (say 2.5 volts) when the bucket transport is at its desired operating rate. Thereafter, decreases in the bucket transport rate will alter the frequency of the output pulses from the timer 31 to generate a DC voltage of less than this set reference magnitude. It is thus apparent that by coupling trigger networks to the output of the stage 14 which are respectively responsive to voltage drops of different magnitudes (of the DC voltage 14a), these trigger networks could then be employed to respond to varying degrees of "slow-downs" of the bucket transport rate.

Accordingly, the output from the integrator network 32 is coupled as one input to the trigger network 17 and specifically to the inverting input of a comparator 40 thereof. The non-inverting (or reference) terminal of the comparator 40 has a DC voltage applied thereto (by way of terminal X) which is 90% of the calibrated set reference DC voltage at the output of network 32 (thus representing 90% of the normal operating speed of the bucket transport). For example, when the calibrated value of the DC voltage at the output of integrator 32 is 2.5 volts for the desired rated speed of bucket travel, the reference voltage applied to the terminal X would be 2.25 volts.

The output of the comparator 40 is thereafter coupled to the input of a transistor drive network 41 which could then be coupled, for example, to a circuit interruptor for the motive drive to the conveyor 5 (FIG. 1).

In similar manner, the output of the integrator network 32 is also coupled to the inverting terminal of a comparator 42 forming part of the trigger network 18. In this instance, however, the reference voltage applied to the non-inverting terminal of comparator 42 (by way of input terminal Y) would represent 80% of the rated bucket transport speed, i.e. 2.0 volts. The output of the comparator 42 is then coupled to the input of transistor drive network 43, the output of which can then be coupled to an interruptor network (and suitable alarm devices) to the motive drive for the transport belt 2.

It is thus apparent that whenever the bucket transport rate drops below 90% of its normal operating speed, the resulting pulse at the output of the comparator 40 will trigger the transistor drive network 41 to shut down the conveyor 5, as well as to actuate appropriate visual and/or audible alarms for indicating such condition.

The temporary shut down of the feed operation by conveyor 5 may be sufficient to therefore remedy the cause of the bucket slowdown. If, however, the slowdown persists and the bucket transport rate drops below 80% of the normal operating speed, the resulting output signal from the comparator 42 will trigger transistor drive network 43, thereby to interrupt the motive power for the transport belt 2 and effectively shut down the entire grain elevator operation, with suitable alarms being actuated to indicate such condition.

In accordance with a specific feature of the apparatus of the present invention, the trigger network 16 is effective to lock out the actuation of transistor drive networks 41 and 43 until the bucket transport rate initially reaches its desired operating speed (or at least 90% of such speed). The trigger network 16 is also effective to initiate the shutdown of the grain elevator operation in the event that, upon initiation of the elevator operation, the transport belt, once moving, slows down before it reaches the normal operating speed.

Specifically, at the heart of the trigger network 16 is a control flip-flop 45 having one output (indicated as 46) interconnected with the trigger networks 17 and 18 in the manner depicted in FIG. 3 and a second output (indicated as 47) connected to the input of a transistor drive network 48. The inputs to flip-flop 45 are derived from the outputs from a comparator 62, timer 61, and the comparator 40.

The application of the power to initiate the grain elevator apparatus is detected at the output of the equipment starter 60; and after an initial time delay generated by the timer 61, the output of comparator 62 is interrogated. If the DC voltage at the output of integrator network 32 (which is applied to the negative input terminal of comparator 62) is increasing, thus indicating normal increase of the bucket and belt transport, the signal at output 46 of the flip-flop 45 is at a first state which prevents actuation of either transistor drive networks 41 and 43, thus effectively "locking out" the trigger networks 17 and 18. Thereafter, when the bucket transport speed increases above 90% of its normal operating rate, this condition is sensed at the output of comparator 40 and inputted (by way of input lead 65) to the flip-flop 45, thus changing the state of the flip-flop, generating the resulting change-of-state signal on line 46, to "enable" the trigger networks 17 and 18.

On the other hand, if the initial interrogation of the output of comparator 62 indicates that the DC voltage at the output of integrator network 32 is not increasing, the flip-flop 45 changes state to produce a signal at the output 46 which actuates transistor drive 43, thereby shutting down the entire elevator operation. A similar control can be coupled to the flip-flop 45 for effecting this shut down if the bucket transport, once begun, slows down before reaching the 90% rate. The output state of the flip-flop 45 is also (by way of lead 47) effective to actuate the transistor drive network 48 to visually indicate (by appropriate lights coupled thereto) the existing conditions.

Figure 4:
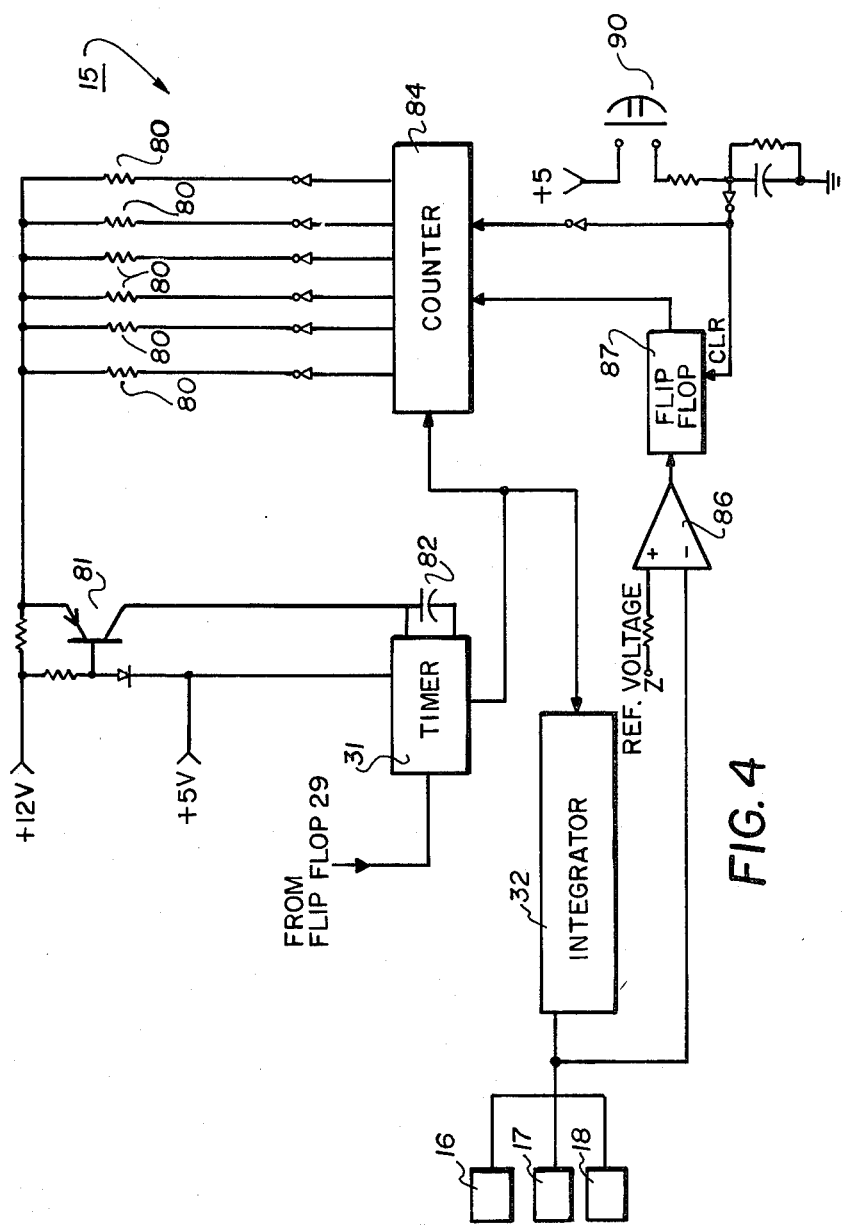
FIG. 4 is a schematic illustration of a preferred form of an automatic calibration control for the motion detector apparatus of the present invention.

As previously described, a calibration control network 15 (FIG. 2) is coupled to the DC signal generator 14, and specifically the timer 31, to assure that the DC voltage generated at the output of integrator 32 is at a predetermined reference magnitude whenever the rate of transport of the buckets is at the desired operating speed. With reference now to FIG. 4, there is now described a preferred embodiment of a calibration control 15 which is effective to automatically provide such calibration for respectively different operating speeds, thus enabling the motion detector apparatus of the present invention to be applied to grain elevator equipment which is to be operated at respectively different operating speeds.

Accordingly, a pulse width control network principally consisting of a bank of parallel connected binary weighted resistors 80, transistor 81 and capacitor 82 is coupled intermediate the output of a conventional digital counter 84 and the timer 31. The output of the integrator 32, coupled to trigger network 16–18 as previously described, is additionally coupled to the negative input of a comparator 86, a reference voltage being applied to the positive input terminal (by way of terminal Z) which corresponds to the desired calibrated value of the DC voltage 14a (in the previous example, 2.50 volts). The output of comparator 86 is coupled to the input of flip-flop 87, the output of which is coupled to counter 84. In addition, the pushbutton switch 90 is effective to activate counter 84 and initiate the "clear" signal to flip-flop 87.

In accordance with the operation of the automatic calibration control 15, the grain elevator equipment is actuated and once the bucket transport speed reaches the desired operating rate, the calibration control 15 is commanded to "calibrate" by the depression of pushbutton 90. At this point in time, the pulse width of each of the output pulses from timer 31 is at a minimum.

With the depression of the pushbutton 90, and the consequent stepping of the pulse width control circuitry by the counter 84, the pulse width of the output pulses from timer 31 is slowly increased to the desired 50% duty cycle, at which time the DC voltage at the output of integrator 32 reaches the predetermined reference value of 2.5 volts. This condition is then sensed by the comparator 86 which triggers the flip-flop 87, thus de-actuating counter 84 and terminating the calibration process.

The calibration information is then "stored" in the counter 84, and the motion detector apparatus is effective to operate in the manner previously described, for so long as the desired operating rate of the bucket transport does not change. In the event that it is desired to subsequently change the desired bucket operating rate, the grain elevator apparatus is adjusted to the new desired speed, at which time the pushbutton 90 is again depressed and the new calibration established in the same manner as that just described.

Various modifications to the disclosed embodiment, as well as alternate embodiments, may become apparent to one skilled in the art without departing from the spirit and scope of the invention as defined by the appended claims.

What is claimed is:

1. In combination with grain elevator equipment of the type including a plurality of spaced buckets for conveying granular material between feed and dispensing stations, first motive means for continuously transporting said buckets between said stations, second motive means for supplying said granular material to said buckets at said feed station, said buckets having a metallic material associated therewith, motion detector apparatus for sensing and responding to the rate of transport of said buckets, said motion detector apparatus comprising:

a probe assembly including means for generating a magnetic field and sensor means for detecting and generating a first signal in response to the intrusion of metallic material into said magnetic field; said probe assembly positioned at a situs which enables the metallic material associated with each of said buckets to pass through said magnetic field during their transport past said situs;

a control module remote from said probe assembly, said control module comprising:

(a) detector means responsive to said first signal for generating a time varying analog signal, the magnitude of which is proportional to the proximity of each bucket to said situs;

(b) pulse generator means responsive to said time varying analog signal for generating a digital pulse signal train, the pulse frequency of which is proportional to the rate of transport of the said buckets past said situs;

(c) signal generator means responsive to said digital pulse signal train for generating a DC voltage, the magnitude of which is proportional to the rate of transport of the said buckets past said situs;

(d) calibration control means coupled to said signal generator means and operable to condition said signal generator means to generate a DC voltage of a predetermined magnitude when the rate of transport of said buckets past said situs is at a selected one of a plurality of desired operating rates;

(e) first trigger means coupled to said signal generating means for generating a first control signal for controlling said second motive means when the said DC voltage is less than said predetermined magnitude by a first deficient amount; and (f) second trigger means coupled to said signal generating means for generating a second control signal for controlling said first motive means when the said DC voltage is less than said predetermined magnitude by a second deficient amount greater than said first deficient amount.

2. The combination as defined by claim 1 wherein the first control signal from said first trigger means interrupts said second motive means, thereby to terminate the supply of said granular material to said buckets at said feed station.

3. The combination as defined by claim 1 wherein the second control signal from said second trigger means interrupts said first motive means, thereby to interrupt the transport of said buckets between said stations.

4. In combination with grain elevator equipment of the type including a plurality of spaced buckets for conveying granular material between feed and dispensing stations, first motive means for continuously transporting said buckets between said stations, second motive means for supplying said granular material to said buckets at said feed station, said buckets having a metallic material associated therewith, motion detector apparatus for sensing and responding to the rate of transport of said buckets, said motion detector apparatus comprising:

a probe assembly including means for generating a magnetic field and sensor means for detecting and generating a first signal in response to the intrusion of metallic material into said magnetic field; said probe assembly positioned at a situs which enables the metallic material associated with each of said buckets to pass through said magnetic field during their transport past said situs;

a control module remote from said probe assembly, said control module comprising:

(a) detector means responsive to said first signal for generating a time varying analog signal, the magnitude of which is proportional to the proximity of each bucket to said situs;

(b) pulse generator means responsive to said time varying analog signal for generating a digital pulse signal train, the pulse frequency of which is proportional to the rate of transport of the said buckets past said situs;

(c) signal generator means responsive to said digital pulse signal train for generating a DC voltage, the magnitude of which is proportional to the rate of transport of the said buckets past said situs;

(d) calibration control means coupled to said signal generator means for assuring that the DC voltage generated by said signal generator means if of a predetermined magnitude when the rate of transport of said buckets past said situs is at a desired operating rate;

(e) first trigger means coupled to said signal generating means for generating a first control signal for controlling said second motive means when the said DC voltage is less than said predetermined magnitude by a first deficient amount;

(f) second trigger means coupled to said signal generating means for generating a second control signal for controlling said first motive means when the said DC voltage is less than said predetermined magnitude by a second deficient amount greater than said first deficient amount; and (g) third trigger means coupled to said signal generating means for generating a third control signal to interrupt the transport of said buckets whenever, upon initiation of said first motive means, the rate of transport of said buckets does not increase to the said desired operating rate, said third trigger means including means for preventing actuation of said first and second trigger means until said bucket transport rate initially reaches said desired operating rate.

5. The combination as defined by claim 4 wherein said calibration control means is effective to generate said predetermined magnitude DC voltage for respectively different desired operating rates.

6. In combination with grain elevator equipment of the type including a plurality of spaced buckets for conveying granular material between feed and dispensing stations, first motive means for continuously transporting said buckets between said stations, second motive means for supplying said granular material to said buckets at said feed station, said buckets having a metallic material associated therewith, a motion detector apparatus for sensing and responding to the rate of transport of said buckets, said motion detector apparatus comprising:

(a) metal detector means for generating first signals respectively responsive to the passage of each bucket in proximity to said metal detector means;

(b) control means electronically coupled to said metal detector means responsive to said first signals for generating a DC voltage proportional to the rate of transport of said buckets past said metal detector means;

(c) automatic calibration means coupled to said control means for assuring that the DC voltage is of an identical predetermined magnitude for respectively different desired operating rates of said bucket transport; and (d) trigger means coupled to said control means for generating respective trigger signals for controlling said second motive means whenever the said DC voltage is less than said predetermined magnitude by a first deficient amount and for controlling said first motive means whenever the said DC voltage is less than said predetermined magnitude by a second deficient amount greater than said first deficient amount.

7. The combination as defined by claim 6 wherein said control means includes a timer and said automatic calibration means is coupled to said timer for regulating the pulse width of the output pulses from said timer.

8. The combination as defined by claim 7 wherein said control means further comprises an integrator network coupled to the output of said timer.

9. The combination as defined by claim 7 wherein said automatic calibration means comprises pulse width control means and counter means, the pulse width control means being stepped by the output of the said counter.

10. The combination as defined by claim 6 wherein said trigger signals are respectively effective to interrupt said first motive means and said second motive means.

* * * * *